United States Patent [19]

Juang

[11] Patent Number: 5,781,887
[45] Date of Patent: Jul. 14, 1998

[54] SPEECH RECOGNITION METHOD WITH ERROR RESET COMMANDS

[75] Inventor: Biing-Hwang Juang, Warren, N.J.

[73] Assignee: Lucent Technologies Inc., Murray Hill, N.J.

[21] Appl. No.: 728,012

[22] Filed: Oct. 9, 1996

[51] Int. Cl.[6] .......................... G10L 7/08; G10L 9/00
[52] U.S. Cl. .................. 704/275; 704/248; 704/244; 704/258; 379/67
[58] Field of Search ....................... 704/275, 200, 704/248, 244, 258; 395/611; 379/67

[56] References Cited

U.S. PATENT DOCUMENTS

| | | | |
|---|---|---|---|
| 4,639,877 | 1/1987 | Raymond et al. | 704/258 |
| 4,769,844 | 9/1988 | Fujimoto et al. | 704/248 |
| 5,127,055 | 6/1992 | Larkey | 704/244 |
| 5,255,341 | 10/1993 | Nakajima | 704/200 |
| 5,317,730 | 5/1994 | Moore et al. | 395/611 |
| 5,452,340 | 9/1995 | Engelbeck et al. | 379/67 |
| 5,577,164 | 11/1996 | Kaneko et al. | 395/275 |

*Primary Examiner*—David R. Hudspeth
*Assistant Examiner*—Vijay B. Chawan

[57] ABSTRACT

A method for revising at least a portion of a sequence of speech data segments recognized by an automated speech recognition system. A user is prompted to vocalize the speech data segments sequentially, one speech data segment at a time. When each speech data segment is recognized it is stored as a data element and a confirmation of recognition is issued to the user. The user may then issue a verbal command to delete the last recognized data element if the confirmation indicates that a recognition error has occurred, and then repeat the last speech data element for a second recognition attempt. The user may also issue another verbal command to delete all thus-far recognized data elements in the sequence and to restart the recognition process from the beginning. If no such verbal commands are issued by the user, then the user may continue to vocalize the next sequential speech data segment.

6 Claims, 1 Drawing Sheet

SPEECH RECOGNITION METHOD WITH ERROR RESET COMMANDS

BACKGROUND OF THE INVENTION

1. Field of the Invention

The present invention relates to automated speech recognition. More particularly, the invention is directed to a method for revising recognized speech data using verbal commands.

2. Description of the Related Art

Speech recognition systems are well known in the art. In particular, such systems are used with increasing frequency in telephone data acquisition applications. For example, many banks permit a customer calling a customer service telephone number to vocalize, for automated recognition, the customer's credit card number. This approach is particularly advantageous when the customer is handicapped or has poor eyesight which impairs the use of a telephone keypad. In another example, a telephone information retrieval service may be automated by enabling a user to specify the desired information to a computer system capable of speech recognition. The computer system may then retrieve the desired information without human intervention resulting in considerable savings in time and personnel costs.

However, telephonic speech recognition systems suffer from a number of serious drawbacks. Typically, a speech recognition system interprets a user's vocalization as a sequence of speech data segments, with each segment being representative of a corresponding data element. For example, if the user vocalizes a credit card number, the speech recognition system treats each spoken number as a speech data segment with a data element being the value of the spoken number. In another example, where the user vocalizes an address, the speech recognition system treats each word or set of words of the address as a speech data segment. Thus, a vocalized address consists of a number of speech data segments, each being representative of a street name, city, state, zip code, etc. Because a typical vocalization is quite long, an error is often made by the user or by the speech recognition system during the recognition process. For example, the user may mis-speak or vocalize a wrong word or number, or the recognition system may experience a false recognition error. In a typical speech recognition system the user may be forced to complete the entire recognition process, even though an error was made during the process; the user must then re-start the process from the beginning, which is inconvenient for the user and expensive for the party paying for the telephone call. More advanced recognition systems enable the user to use a telephone keypad to reset recognition to the beginning. However, this approach is problematic because the user is forced to use the keypad which defeats the purpose of speech recognition. In addition, the user may have been close to the completion of the recognition process before an error was made, and restarting the process is thus cumbersome and inconvenient.

It would thus be desirable to enable a user to revise an ongoing speech recognition process by selectively deleting the last recognized data element via a first verbal command when a recognition error is made. It would further be desirable to enable a user to restart the entire speech recognition process by issuing a second verbal command.

SUMMARY OF THE INVENTION

A method for revising the ongoing recognition of at least a portion of a sequence of speech data segments recognized by a speech recognition system is provided. A user is prompted to vocalize the speech data segments sequentially and contiguously, one at a time. When each speech data segment is recognized it is stored as a data element and a confirmation of its recognition may be issued to the user. The user may then issue a first verbal command to delete the last recognized data element if an error (i.e., a mis-spoken or a mis-recognized segment) has occured or been found. The user may then repeat the last speech data element for a second recognition attempt before the recognition process continues. Instead of the first verbal command, the user may issue a second verbal command to delete all previously recognized data elements and to restart the recognition process from the beginning.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

DETAILED DESCRIPTION OF THE PRESENTLY PREFERRED EMBODIMENT

Figure 1:
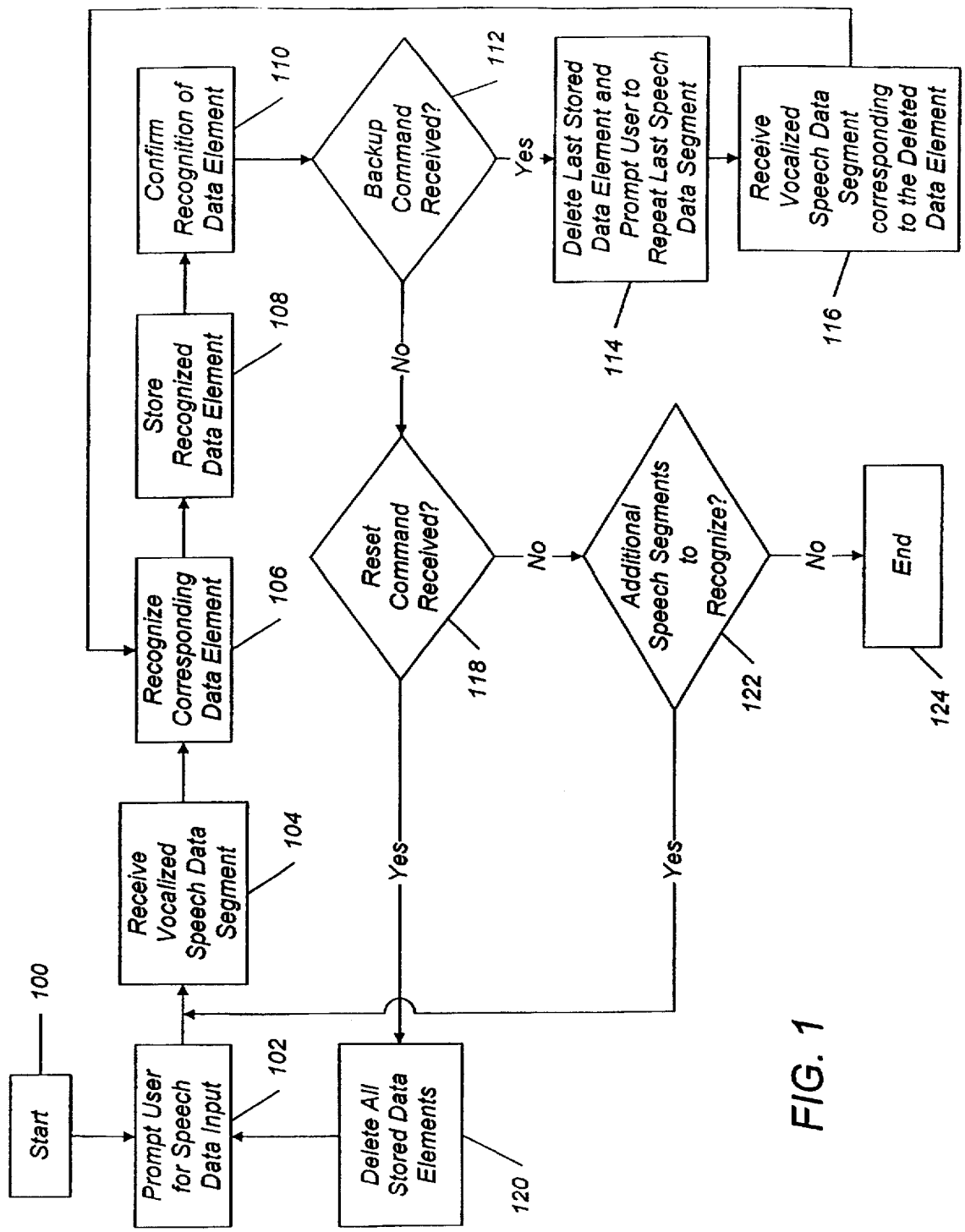
FIG. 1 is a flow chart depicting a method for revising recognized speech data using verbal commands implemented in accordance with the teachings of the present invention.

The present invention is broadly directed to a method for revising recognized speech data through the issuance of verbal commands. The method of the invention is preferably implemented in a digital computer-based speech recognition system capable of both interpreting verbal commands and recognizing speech data, and of at least temporarily storing recognized speech data in a memory. A typical speech recognition system receives speech as a collection or stream of speech data segments. As each speech data segment is vocalized by a user, the automated speech recognition system recognizes and stores a data element corresponding to that speech data segment. In accordance with the present invention, by use of a first verbal command a user may delete the last recognized data element, and by use of a second verbal command the user may delete all previously recognized data elements and re-start the recognition process. Preferably, the verbal commands are pre-defined and selected so as not to be interpreted as speech data segments by the speech recognition system but, rather, simply to control its operation. The exact words used as commands are selected when the method of the present invention is implemented, and are preferably communicated to the user prior to the initiation of the speech recognition process. For example, the first verbal command may be "back" and the second verbal command may be "reset". The exact word used for each command is not important so long as that word is pre-defined as a command for the speech recognition system and communicated to the user prior to an occasion for its use arising in the recognition process.

Referring to FIG. 1, the inventive method begins at step 100 and proceeds to step 102 where the user is prompted to vocalize a group of speech data segments for recognition, one speech data segment at a time. The number of speech data segments to be recognized is dependent on the nature of the speech data expected by the speech recognition system.

For example, if the speech recognition system expects a ten digit account number to be entered, the prompt at step 102 may be "Please state your ten digit account number." The speech recognition system would then expect ten speech data segments, each consisting of one number.

At step 104 the system receives, for recognition, a speech data segment vocalized by the user. At step 106 the speech recognition system analyzes the data segment and identifies or recognizes a corresponding data element from the speech data segment received at step 104. For example, if the user vocalized "five", then the system would recognize the number "5". The speech recognition at step 106 may be accomplished by any well-known or otherwise suitable speech recognition technique and using any suitable implementing hardware such, by way of example, as a general purpose or specially configured digital computer. At step 108, the recognized data element is temporarily stored in a speech recognition system memory for later retrieval. For example, if a ten digit account number is being processed by the speech recognition system, all ten numbers must be identified and stored before recognition is complete.

At step 110, the speech recognition system confirms its identification or recognition of the data element at step 108 with the user by using speech synthesis to convert the last recognized data element back into a speech data segment audible to the user. This step permits the user to monitor the accuracy of the speech recognition process, and thus aids the user in deciding whether a "back" or a "reset" verbal command should be issued (irrespective of the exact words or verbalizations used or selected to indicate such commands). It should be noted, however, that the confirmation step 110 may be eliminated without departing from the spirit of the present invention, especially if the speech recognition system used for implementation of the present invention does not have speech synthesis capability. If confirmation is not used, then the user may issue the verbal control commands based on whether the user made a known or obvious mistake in vocalizing a previous speech data segment.

If the user mis-spoke a speech data element or vocalized an unintended or inaccurate speech data element that was received at step 104, or if there was an error in recognition by the speech recognition system, the user may then issue the "back" verbal command to delete the erroneous data element. At test 112, the system determines whether the "back" command has been vocalized by the user. If the "back" command has been vocalized, then at step 114 the last recognized data element stored at step 108 is deleted, and the user is prompted to repeat the last vocalized speech data segment. At step 116, the repeated speech data segment is received by the speech recognition system, and flow then returns to step 106 for another recognition attempt.

If the "back" command was not received by the speech recognition system at test 112, then flow proceeds to test 118. Instead of deleting the last data element, the user may delete all previously recognized data elements and restart the entire recognition process by issuing the "reset" verbal command. If, at test 118, the "reset" command has been received, then flow proceeds to step 120 where all previously stored data elements are deleted; flow then returns to step 102 where the user is prompted to re-start the recognition process. If the "reset" command was not received by the speech recognition system at test 118, then flow proceeds to test 122 where it is determined whether there are additional speech data segments to be input and recognized. When the speech recognition system expects a particular number of speech data segments, this determination may be accomplished by use of a simple counter and comparator to count the stored data elements and to compare the current count to the total expected number of data elements. A speech recognition system may also be required to recognize a variable-sized group of speech data segments, such as an address. In such a situation, an external indicator of the completion of the speech recognition process is preferably used. For example, a pause of a pre-determined length may indicate that there are no more speech data segments to be recognized. Alternatively, a third verbal command such as "end" may be vocalized by the user to the same effect. If there are additional speech data segments remaining to be recognized, then flow returns to step 104 where the user may vocalize the next speech data segment; otherwise flow proceeds to step 124 at which the recognition process ends.

While there have shown and described and pointed out fundamental novel features of the invention as applied to a preferred embodiment thereof, it will be understood that various omissions and substitutions and changes in the form and details of the herein-disclosed method, and in its operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for enabling selective revision of at least one data element identified from user vocalized speech data by an automated speech recognition apparatus through use of predetermined spoken commands issued by a user, comprising the steps of:

(a) prompting by the apparatus for user input of vocalized speech data comprising a plurality of speech data segments each representative of a data element;

(b) receiving by the apparatus one of the user vocalized speech data segments of said plural speech data segments;

(c) analyzing in the apparatus the received vocalized speech data segment to identify a data element corresponding to the received vocalized speech data segment;

(d) storing the identified data element in a memory of the apparatus;

(e) after storing of the identified data element in the memory of the apparatus, (1) deleting by the apparatus the identified data element stored at said step (d) and returning to said step (b) for said one user vocalized speech data segment when a first spoken command, representing a user-vocalized request that input of said one user-vocalized speech data segment is to be repeated, is issued by the user and received by the apparatus; and (2) deleting by the apparatus all identified data elements previously stored in the memory of the apparatus and returning to said step (a) when a second spoken command, representing a user-vocalized request that input of all previously stored identified data elements is to be repeated, is issued by the user and received by the apparatus; and (f) after said step (d) and absent receipt of said first and second user-issued commands, determining by the apparatus whether all speech data segments of said plural data segments have been analyzed, and returning to said step (b) if all speech data segments of said plural data segments have not been analyzed.

2. The method of claim 1 further comprising the step of:

(g) confirming by the apparatus, after said step (d) and before said step (e), accuracy of the identification of the data element stored at said step (d) by vocalizing the stored identified data element to the user.

3. A method for enabling selective revision of at least one data element identified from user vocalized speech data by an automated speech recognition apparatus through use of a predetermined spoken command issued by a user, comprising the steps of:

(a) prompting by the apparatus for user input of vocalized speech data comprising a plurality of speech data segments each representative of a data element;

(b) receiving by the apparatus one of the user vocalized speech data segments of said plural speech data segments;

(c) analyzing in the apparatus the received vocalized speech data segment to identify a data element corresponding to the received vocalized speech data segment;

(d) storing the identified data element in a memory of the apparatus;

(e) after storing of the identified data element in the memory of the apparatus, deleting by the apparatus the identified data element stored at said step (d) and returning to said step (b) for said one user vocalized speech data segment when the predetermined spoken command, representing a user-vocalized request that input of said one user-vocalized speech data segment is to be repeated, is issued by the user and received by the apparatus; and (f) after said step (d) and absent receipt of said user-issued command, determining by the apparatus whether all speech data segments of said plural data segments have been analyzed, and returning to said step (b) if all speech data segments of said plural data segments have not been analyzed.

4. The method of claim 3 further comprising the step of:

(g) confirming by the apparatus, after said step (d) and before said step (e), accuracy of the identification of the data element stored at said step (d) by vocalizing the stored identified data element to the user.

5. A method for enabling selective revision of all data elements identified from user vocalized speech data by an automated speech recognition apparatus through use of a predetermined spoken command issued by a user, comprising the steps of:

(a) prompting by the apparatus for user input of vocalized speech data comprising a plurality of speech data segments each representative of a data element;

(b) receiving by the apparatus one of the user vocalized speech data segments of said plural speech data segments;

(c) analyzing in the apparatus the received vocalized speech data segment to identify a data element corresponding to the received vocalized speech data segment;

(d) storing the identified data element in a memory of the apparatus;

(e) after storing of the identified data element in the memory of the apparatus, deleting by the apparatus all identified data elements previously stored in the memory of the apparatus and returning to said step (a) when the predetermined spoken command, representing a user-vocalized request that input of all previously stored identified data elements is to be repeated, is issued by the user and received by the apparatus; and (f) after said step (d) and absent receipt of said predetermined user-issued command, determining by the apparatus whether all speech data segments of said plural data segments have been analyzed, and returning to said step (b) if all speech data segments of said plural data segments have not been analyzed.

6. The method of claim 5 further comprising the step of:

(g) confirming by the apparatus, after said step (d) and before said step (e), accuracy of the identification of the data element stored at said step (d) by vocalizing the stored identified data element to the user.

* * * * *